(12) United States Patent
Krywitsky

(10) Patent No.: US 7,267,178 B2
(45) Date of Patent: *Sep. 11, 2007

(54) FLUID SYSTEM COMPONENT WITH SACRIFICIAL ELEMENT

(75) Inventor: Lee A. Krywitsky, Calgary (CA)

(73) Assignee: Hiltap Fittings, Ltd., Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 11/254,636

(22) Filed: Oct. 20, 2005

(65) Prior Publication Data

US 2006/0102358 A1    May 18, 2006

Related U.S. Application Data

(63) Continuation of application No. 10/660,352, filed on Sep. 11, 2003, now Pat. No. 7,028,778.

(60) Provisional application No. 60/409,895, filed on Sep. 11, 2002.

(51) Int. Cl.
*E21B 29/02* (2006.01)
(52) U.S. Cl. ...................... 166/376; 166/317
(58) Field of Classification Search ............... 166/317, 166/376, 162
See application file for complete search history.

(56) References Cited

U.S. PATENT DOCUMENTS

| | | | |
|---|---|---|---|
| 1,814,800 | A | 7/1931 | Heeter |
| 3,055,424 | A | 9/1962 | Allen |
| 3,994,338 | A | 11/1976 | Hix |
| 5,161,828 | A | 11/1992 | Hynes et al. |
| 6,095,247 | A | 8/2000 | Streich et al. |
| 6,397,950 | B1 | 6/2002 | Streich et al. |
| 6,497,285 | B2 | 12/2002 | Walker |
| 6,672,389 | B1 | 1/2004 | Hinrichs |
| 6,752,212 | B2 | 6/2004 | Burris et al. |
| 2004/0118566 | A1 | 6/2004 | Krywitsky |

FOREIGN PATENT DOCUMENTS

WO    WO 2004/025160    3/2004

*Primary Examiner*—William P. Neuder
(74) *Attorney, Agent, or Firm*—Workman Nydegger

(57) ABSTRACT

A fluid system component is provided that is implemented as a section of metal pipe having a predetermined wall thickness and including a sacrificial element intended to preferentially fail upon the occurrence of certain predefined conditions. The sacrificial element takes the form of a window of predetermined geometry that covers an opening defined in the wall of the pipe. The window is configured to have a thickness substantially less than the wall thickness of the pipe, but nonetheless sufficiently great that the window remains materially unaffected by normal system operating conditions to which it is exposed. When the window is exposed to a pressure differential of predetermined magnitude, typically much greater than normal system operating pressures, the relatively thin window ruptures and permits the pressurized material, either inside or outside the pipe, to flow through the rupture.

19 Claims, 7 Drawing Sheets

FLUID SYSTEM COMPONENT WITH SACRIFICIAL ELEMENT

RELATED APPLICATION

This application is a continuation of U.S. patent application Ser. No. 10/660,352, filed Sep. 11, 2003, now U.S. Pat. No. 7,028,778 entitled FLUID SYSTEM COMPONENT WITH SACRIFICIAL ELEMENT, which claims the benefit of U.S. Provisional Patent Application Ser. No. 60/409,895, entitled SACRIFICIAL FLUID SYSTEM COMPONENT, filed Sep. 11, 2002, both of which are incorporated herein in their entirety by this reference.

BACKGROUND OF THE INVENTION

1. Field of the Invention

The present invention relates generally to fluid systems. More particularly, exemplary embodiments of the invention relate to a fluid system component having a sacrificial element intended to assume an irreversible configuration upon the occurrence of certain predefined conditions, so as to facilitate achievement of a desired effect concerning the associated fluid system.

2. Related Technology

In typical oil and gas exploration efforts, an initial search is made to identify various geographical formations that are believed to be potential sources of a desired product. When such geographical formations have been located and identified, one or more exploratory wells are drilled in an effort to ascertain aspects such as the quantity, quality and accessibility of any materials that may be present. Once it has been determined that it is economically viable to recover the discovered materials, a well, or well hole, is drilled in order to facilitate access to those materials.

After the well hole has been drilled, a casing is inserted into the ground and cemented in position in the well hole. Typically, the casing comprises a series of hollow members connected end to end in order to form the long, hollow casing pipe "string." After the casing has been secured in position, a production pipe is inserted down through the casing. The production pipe extends downward into the area where the gas, oil or other materials are located. In some installations, the lower portion, or other selected portion, of the production pipe is perforated so that the oil, gas, or other materials can flow into the production pipe and up to a wellhead connected to the production pipe and located at the surface. In many cases however, the natural pressure of the material desired to be recovered is not sufficient to ensure that the material flows to the surface at an adequate rate.

Accordingly, many gas and oil rigs and recovery systems include one or more well pumps, such as a positive displacement pump, configured and arranged to aid in moving the materials to the surface relatively more quickly. Typically, such well pumps include a pump discharge line, or other discharge connection, that is connected to the lower end of the production pipe. A check valve is provided in the pump discharge line so that backflow into the well pump from the discharge line and/or production pipe is prevented. The well pump further includes a suction connection to which is attached a suction line that extends into the area where the gas, oil or other materials are located. In other cases, the well pump is a submersible type, so that the suction connection is submersed in the material to be pumped, and no suction line is required.

In operation, the well pump directs a flow of oil, gas or other materials into the production pipe after another pump located at the surface has cycled. Similar to the well pump, the surface pump may be a displacement type pump. When the gas, oil or other material reaches the surface, those materials are then directed through a wellhead and into the production system.

Often during drilling and/or pumping processes such as those described above, conditions are encountered that may pose a significant danger to both the drilling crew and to the system components and piping. By way of example, materials such as sour gas, corrosives, or other hazardous or undesirable materials are commonly present in oil and gas deposits. When such materials are encountered, those materials may surge uncontrolled into the suction line of the well pump and/or into the casing and production pipe, causing damage to those components. Additionally, such hazardous materials may pass upward into the system piping and components above the surface. In either case, serious damage to the well, and related piping and components, may result and the safety of system operators may likewise be jeopardized. In other cases, the presence of these, or other, materials signifies that the desired materials have been substantially evacuated from the underground formation.

In view of the foregoing, it would be useful to be able to quickly and reliably plug, or otherwise prevent the flow of materials through, the well pump suction and discharge lines and/or the casing and production pipe, so as to prevent the passage of hazardous or other undesirable materials from passing upward into the wellhead and the piping, systems, and components that comprise the above-ground infrastructure of the well and associated systems. In at least some cases, it would further be desirable to provide for permanent cessation of the flow of such materials.

BRIEF SUMMARY OF AN EXEMPLARY EMBODIMENT OF THE INVENTION

Embodiments of the invention relate generally to fluid systems. More particularly, exemplary embodiments of the invention relate to a fluid system component having a sacrificial element intended to fail upon the occurrence of certain predefined conditions, so as to enable quick and reliable cessation of the flow of materials through one or more portions of the fluid system.

In one exemplary embodiment of the invention, a fluid system component is provided that is implemented as a section of metal pipe or tubing having a predetermined wall thickness and configured to be interposed between, and connected either directly or indirectly with, a well pump discharge connection and a production pipe. The fluid system component includes a sacrificial element intended to fail upon the occurrence of certain predefined conditions. Exemplarily, the sacrificial element comprises one or more "windows" of predetermined geometry defined in the wall of the pipe or tubing section. The window is configured to have a thickness substantially less than the wall thickness, but nonetheless sufficiently great that the window remains materially unaffected by normal system operating conditions to which it may be exposed.

However, when the window is exposed to a pressure differential of predetermined magnitude, typically much greater than that experienced under normal system operating conditions, the thin wall of the window will rupture and permit the highly pressurized material, such as a cessation product, to flow through the rupture. Exemplarily, the window is configured to rupture quickly and completely so that maximum fluid flow through the window area will be realized in a relatively short period of time.

BRIEF DESCRIPTION OF THE DRAWINGS

In order that the manner in which the above-recited and other aspects of the invention are obtained, a more particular description of the invention briefly described above will be rendered by reference to specific embodiments thereof which are illustrated in the appended drawings. Understanding that these drawings depict only exemplary embodiments of the invention and are not therefore to be considered limiting of its scope, the invention will be described and explained with additional specificity and detail through the use of the accompanying drawings in which.

DETAILED DESCRIPTION OF EXEMPLARY EMBODIMENTS OF THE INVENTION

Reference will now be made to figures wherein like structures will be provided with like reference designations. It is to be understood that the drawings are diagrammatic and schematic representations of various embodiments of the claimed invention, and are not to be construed as limiting the scope of the present invention in any way, nor are the drawings necessarily drawn to scale.

Generally, embodiments of the invention concern a fluid system component that includes a sacrificial element configured and intended to fail upon the occurrence of certain predefined conditions such as, for example, a predefined pressure differential exerted upon the sacrificial element. More particularly, the failure of the sacrificial element is a selective, or preferential, failure in that the occurrence of the predefined condition causes the sacrificial element to fail, but the occurrence of such predefined condition typically does not cause the failure of other portions of the associated fluid system component.

As discussed in detail elsewhere herein, the sacrificial element exemplarily comprises one or more "windows" of predetermined geometry and arrangement defined in the wall of the pipe or tubing. The window is configured to have a thickness substantially less than the wall thickness, but nonetheless sufficiently great that the window remains materially unaffected by normal system operating conditions to which it may be exposed. However, the exertion, on the window, of a predetermined pressure differential that is outside the bounds of normal operating conditions, causes the window to rupture so that pressurized material flows through the window area, either from within or outside the fluid passageway defined by the pipe or tubing.

I. Aspects of Exemplary Operating Environments

Figure 1:
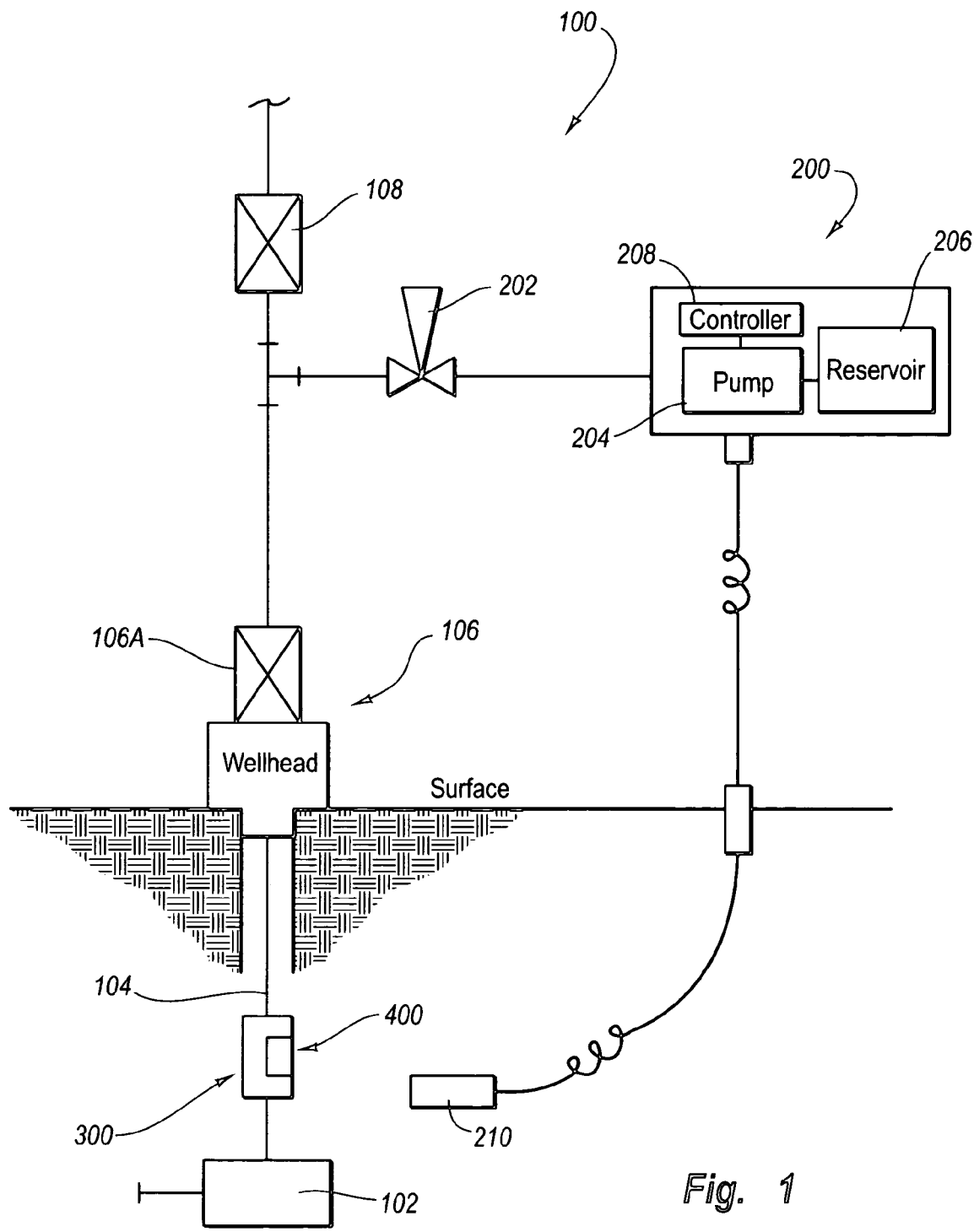
FIG. 1 is a schematic diagram illustrating aspects of an exemplary operating environment for embodiments of the invention, specifically, an oil or gas well and associated systems.

With reference first to FIGS. 1, details are provided concerning various aspects of an exemplary operating environment for at least some embodiments of the invention. The exemplary operating environment comprises a material recovery system, designated at 100, and generally has associated therewith a cessation product system 200 having a fluid system component 300 that defines or otherwise includes one or more sacrificial elements 400.

The material recovery system 100 exemplarily comprises a gas or oil drilling and processing system. However, the scope of the invention is not so limited and embodiments of the invention may, more generally, be employed in any fluid system, or other, application where the functionality disclosed herein may prove useful. In connection with the foregoing, it should be noted that as used herein, "fluid" refers broadly to gases, liquids, and combinations of gases and liquids, as well as to combinations of gases and solids, and combinations of liquids and solids. This is germane with respect both to cessation products that take liquid forms, as well as to the materials in connection with which a fluid system, such as the material recovery system 100, is employed.

With continuing reference now to FIG. 1, the material recovery system 100 includes a well pump 102 that is positioned proximate the underground formation containing the materials that are desired to be recovered. The well pump 102 includes pump suction and discharge connections and is exemplarily implemented as a positive displacement pump, such as a diaphragm pump or peristaltic pump. The well pump 102 may alternatively comprise another type of pump as well. In any case, the well pump 102 includes a suction connection configured and arranged for fluid communication with the underground formation containing the materials to be recovered, as well as a discharge connection attached to, or otherwise arranged for fluid communication with, the fluid system component 300.

It should be noted that the aforementioned arrangement of the fluid system component 300 is exemplary only and should not be construed to limit the scope of the invention in any way. More generally, the fluid system component 300 may be arranged in any other way that would facilitate implementation of the functionality disclosed herein. Moreover, while the illustrated implementation of the material recovery system 100 includes a single fluid system component 300, other implementations of the material recovery system 100 include multiple fluid system components 300.

By way of example, in some alternative arrangements, the fluid system component 300 is attached to, or arranged for fluid communication with the well pump 102 suction connection. In yet other arrangements, the fluid system component 300 is attached to, or otherwise arranged for fluid communication with, both the well pump 102 suction and discharge connections. In another alternative arrangement, the fluid system component 300 is not disposed "in-line" with the well pump 102 discharge line, as indicated in the exemplary arrangement of FIG. 1, but is instead implemented as a stub connection off the well pump 102 discharge line. Of course, various other arrangements of the fluid system component(s) 300 may be employed as well.

As indicated in FIG. 1, the fluid system component 300 is also attached to, or otherwise in fluid communication with, a production pipe 104 that extends up to the surface and terminates in a wellhead 106 located on the surface and including one or more well valves 106A that enable an operator to control the flow of materials from the production pipe 104. Downstream of the wellhead 106, an isolation valve 108 is provided that permits the wellhead 106 to be isolated from other portions of the material recovery system 100.

Additionally, the cessation product system 200 is connected to the wellhead 106 discharge by way of a cessation product isolation valve 202 that enables control of the flow of cessation product, discussed below, into selected portions of the material recovery system 100. In some implementations, the cessation product isolation valve 202 is configured for automatic operation in conjunction with various sensors and/or the cessation product system pump controller, discussed below.

In addition to the cessation product isolation valve 202, the cessation product system 200 further includes a pump 204 connected to a reservoir 206 and operated by way of a controller 208. The cessation product contained in the reservoir 206 may comprise drilling mud, cement, concrete, latex, or any other fluid, gas, or combination thereof effective in implementing the functionality disclosed herein. Exemplarily, the controller 208 is responsive to information received from one or more sensors 210 located proximate the well pump 102 or other component and configured to detect the presence and/or concentration of harmful or undesirable materials in the vicinity of the production pipe 104, fluid system component 300 and/or well pump 102.

In this way, operation of the cessation product system 200 can be automatically initiated in response to the detection of certain types and/or concentrations of materials by the sensor(s) 210. Alternatively however, the cessation product system 200 may be configured for all manual operation, or may alternatively be configured for both manual and automatic operation.

Figure 2:
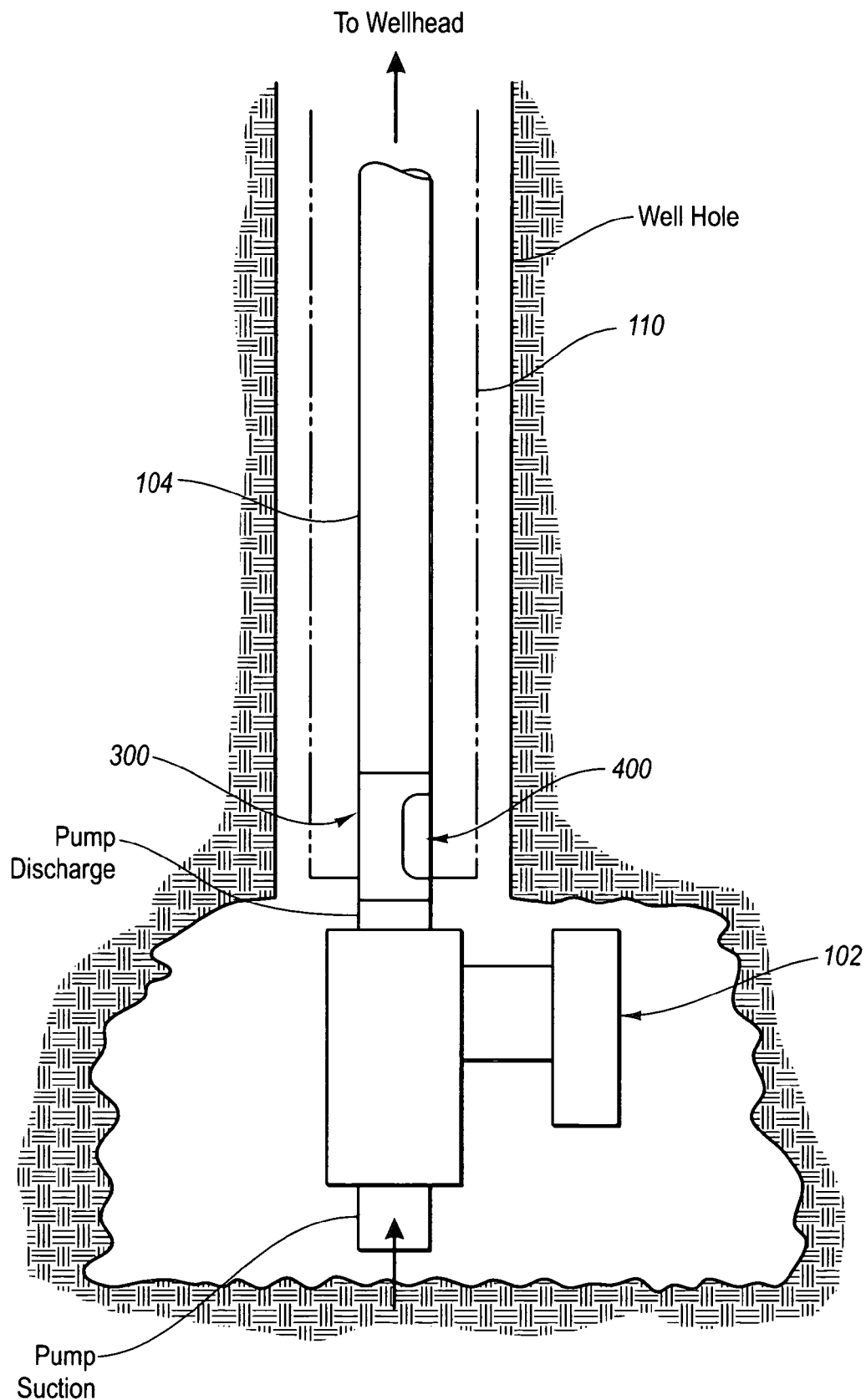
FIG. 2 is a schematic diagram that provides details concerning the arrangement of an exemplary fluid system component, that includes a sacrificial element, with respect to other elements of the exemplary operating environment.

Directing attention now to FIG. 2, further details are provided concerning aspects of an exemplary operating environment for at least some embodiments of the invention. In particular, the material recovery system 100 further includes a casing 110 that is cemented in position in a well hole and is configured to receive the production pipe 104. In this arrangement, the well pump 102 is located proximate the bottom of the casing 110 and is configured for fluid communication with the fluid system component 300 and the production pipe 104. In some implementations, the production pipe 104 fits closely within the casing 110 so that the production pipe 104 comes into contact with the casing 110 as the production pipe 104 is moved down through the casing 110. In this exemplary arrangement, the production pipe 104 extends a sufficient distance below the bottom of the casing 110 that a substantial portion of the fluid system component 300, including the sacrificial element 400, is located below the terminal end of the casing 110. Other arrangements may alternatively be employed however.

II. Aspects of Exemplary Fluid System Components

Figure 3A:
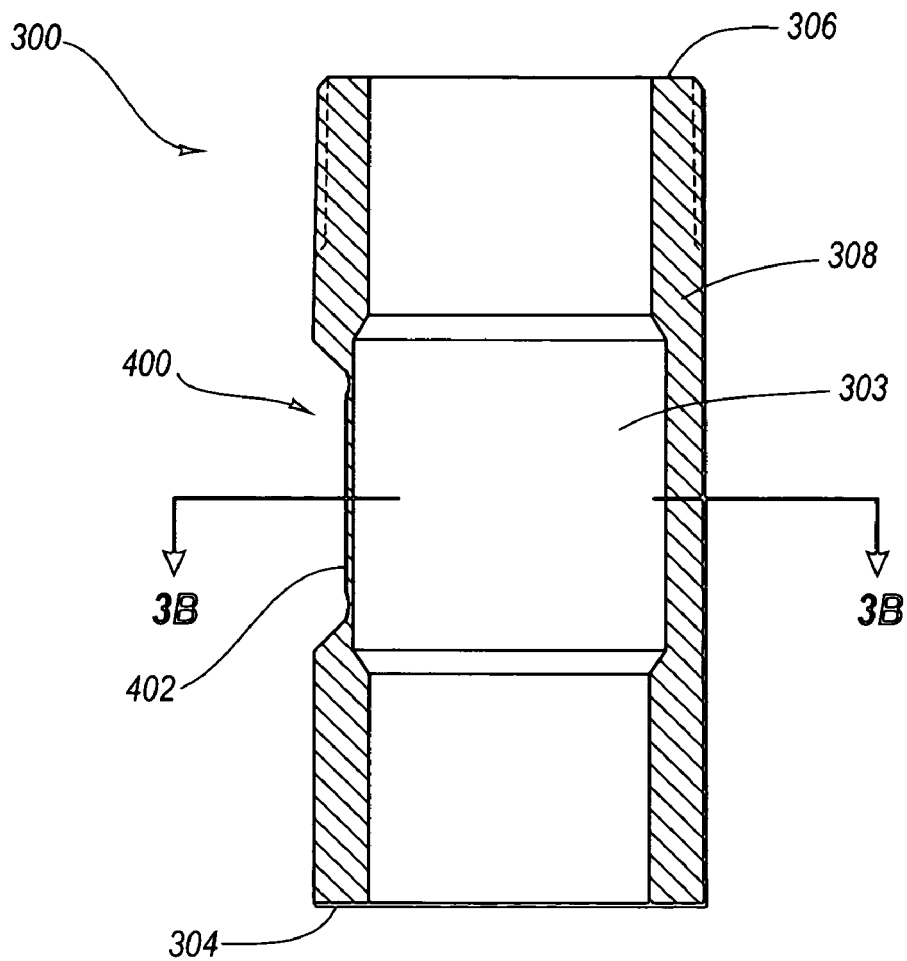
FIG. 3A is an axial section view illustrating aspects of an exemplary implementation of a sacrificial element of a fluid system component as that sacrificial element appears prior to failure.
Figure 3B:
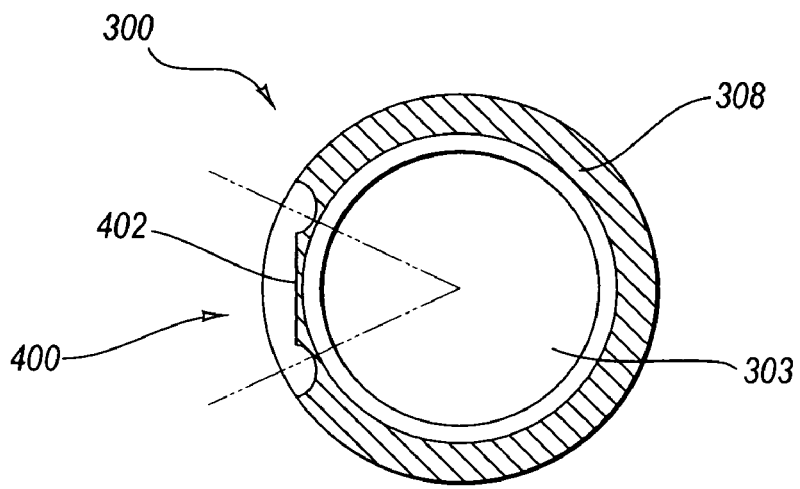
FIG. 3B is a radial section view taken from FIG. 3A and illustrates further aspects of the exemplary sacrificial element as that sacrificial element appears prior to failure.
Figure 3C:
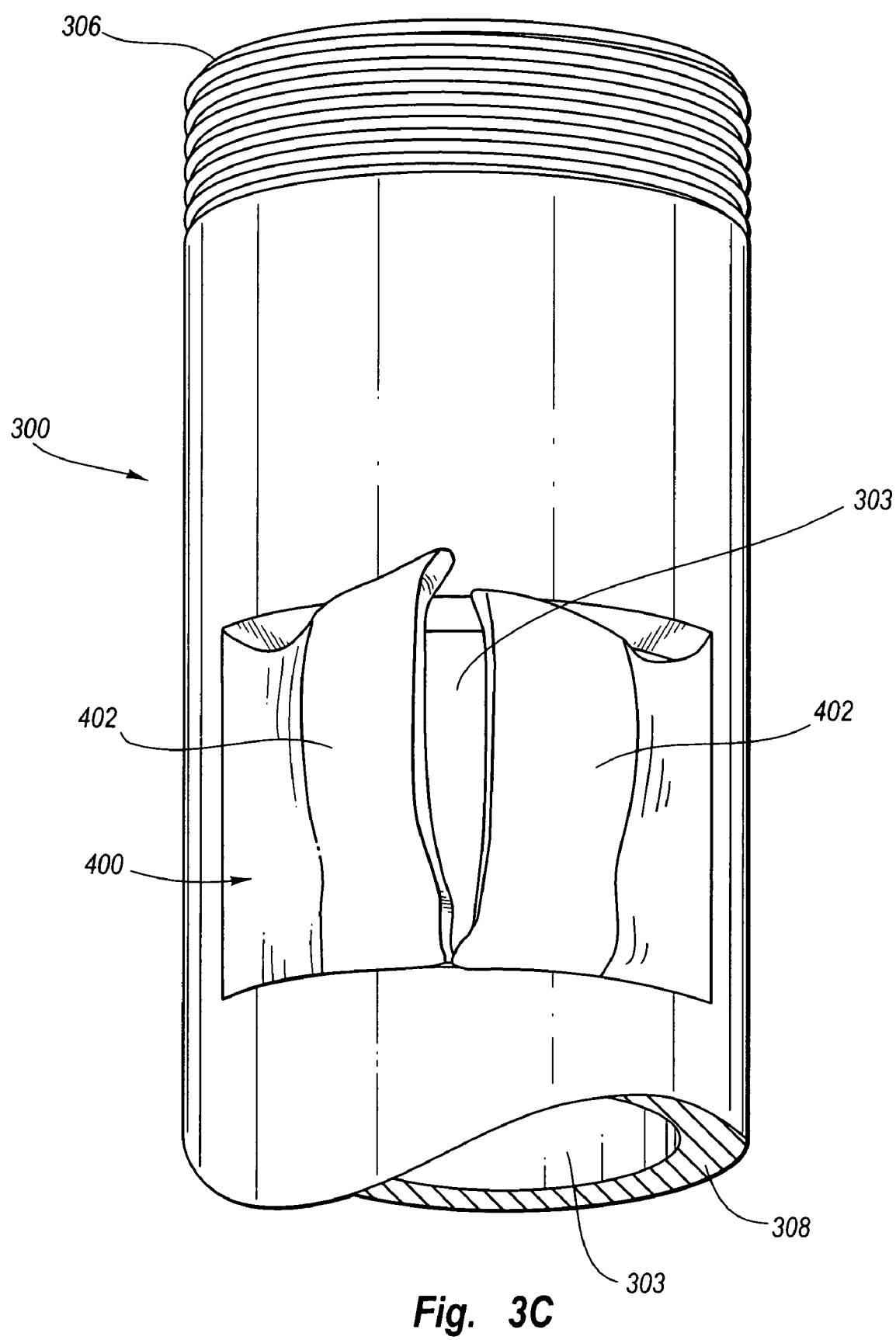
FIG. 3C is a perspective view of an exemplary fluid system component with a sacrificial element that has failed.

With attention now to FIGS. 3A through 3C, details are provided concerning aspects of an exemplary implementation of a fluid system component 300 that includes a sacrificial element 400. As indicated in those figures, and suggested earlier herein, some implementations of the fluid system component 300 comprise a body substantially in the form of a length of metal pipe or tubing 302 having a wall that at least partially defines a fluid passageway 303 and includes inlet and outlet connections 304 and 306, respectively. The inlet and outlet connections 304 and 306 of the fluid system component 300 are configured as necessary to enable attachment of the fluid system component 300 to, for example, the production pipe 104 (FIGS. 1 and 2) and the well pump 102 discharge line. For example, one or both ends of the connections 304 and 306 may be threaded. Alternatively, one or both of the inlet and outlet connections 304 and 306, respectively, of the fluid system component 300 may be configured to be welded, socket welded, brazed, or bolted to the adjacent components and/or piping.

Other aspects of the fluid system component 300 may be varied as well as necessary to suit the requirements of a particular application or operation. For example, aspects of the geometry of the fluid system component 300 such as, but not limited to, the length, diameter, and wall thickness of the fluid system component 300 may be modified. Further, the fluid system component 300 may be constructed from a variety of metallic and non-metallic materials. Examples of suitable metallic materials include, but are not limited to, copper, steel, aluminum, and alloys of copper, steel, and aluminum.

Additionally, the fluid system component 300 may be implemented in forms other than a length of piping or tubing. For example, the fluid system component 300 may take the form of a pipe or tube fitting, or combinations thereof. Examples of such pipe and tube fittings include, but are not limited to, tees, bends, test fittings, taps, caps, plugs and elbows. In yet other exemplary embodiments, the fluid system component 300 is implemented in the form of a valve. More generally however, the fluid system component 300 may be implemented in any form that would enable effective implementation of the functionality disclosed herein.

With continuing attention to FIGS. 3A through 3C, the fluid system component 300 additionally includes a sacrificial element 400. While the illustrated embodiment of the fluid system component 300 includes a single sacrificial element 400, alternative embodiments of the fluid system component 300 include a plurality of sacrificial elements 400. In such alternative embodiments, aspects such as, but not limited to, the geometry, arrangement and orientation of the plurality of sacrificial elements 400, may be varied as necessary to suit the requirements of a particular application or operation. Accordingly, the illustrated implementation of the fluid system component 300 is exemplary only and is not intended to limit the scope of the invention in any way.

In the illustrated implementation of the fluid system component 300, the sacrificial element 400 comprises a window 402 defined in the wall 308 of the fluid system component 300. Aspects of the window 402 are selected in a manner consistent with the intended use and operating conditions for the fluid system component 300. For example, geometrical features such as the size and/or shape of the window 402 may be determined with reference to the desired flow rate of the cessation fluid or other material through the window 402. As another example, it was noted earlier herein that the window 402 is intended to rupture upon exertion, upon the window 402, of a pressure of a predetermined magnitude, or "rupture pressure." Accordingly, the thickness of the window 402 is, exemplarily, determined with reference to such predetermined rupture pressure.

As the foregoing makes clear then, the window 402 is generally configured to remain materially unaffected by the normal system operating pressures to which it may be exposed. However, when the window 402 is exposed to the rupture pressure differential, typically much greater than the pressure differential experience during normal operating conditions, the thin wall comprising the window 402 will rupture and permit the contained cessation product, or other material, to flow through the ruptured window 402, as suggested in FIG. 3C. Exemplarily, the window 402 is configured to rupture quickly and completely so that maximum fluid flow through the window 402 area will be realized in a relatively short period of time. However, other arrangements are included within the scope of the invention.

More generally then, a "sacrificial element" refers to any structure or structural feature, or combination thereof, that is configured and intended to fail in the presence of certain predefined conditions. Examples of such predefined conditions include, but are not limited to, the attainment of a predetermined pressure differential across the sacrificial element.

As suggested above, the rupture pressure is, in some applications, exerted from the outside of the fluid system component 300 so that, upon rupture of the window 402, pressurized materials external to the fluid passageway 303 defined by the fluid system component 300 are able to enter the fluid passageway 303. Accordingly, the scope of the invention is not limited to implementations of the fluid system component 300, or applications thereof, where the rupture pressure is exerted from within the fluid passageway 303.

Further, various other fluid flow effects are achieved through the use of a fluid system component 300 that includes a plurality of windows 402 of varying thicknesses and geometries. Among other things, such varying window 402 thicknesses enable progressive rupturing of the plurality of windows 402 as fluid pressure builds behind the windows 402, rather than the simultaneous rupturing of the plurality of windows 402 that would occur when each of the plurality of windows 402 is substantially the same thickness. This type of arrangement enables, among other things, control over the rate at which the cessation fluid, or other material, flows through the windows 402.

With reference to further aspects of the construction and arrangement of the window 402, exemplary embodiments of the window 402 are formed by machining or other suitable methods. Also, variables such as the window geometry, size, thickness, orientation and location(s) may be varied as desired to facilitate achievement of a desired result. Moreover, multiple windows 402 may be employed in some applications. Such windows 402 may be arranged and oriented as desired. In this regard, it should be noted that, at least in this exemplary embodiment, the window 402 is flush with the outer surface of the pipe wall 308 so that the window 402 is less likely to be subjected to premature wear such as might result from rubbing or other contact between the pipe wall 308 and the casing 110 (FIG. 2) or other components. Contact sometimes occurs, for example, when the production pipe 104 (FIGS. 1 and 2), to which the fluid system component 300 is exemplarily attached, is configured and arranged for a relatively close fit within the casing 110 (FIG. 2).

As suggested by the discussion of FIGS. 3A through 3C, various structural features and components are effective in implementing the functionality afforded by the use of one or more sacrificial elements 400. Another example of a sacrificial element is illustrated in FIGS. 4A through 4C, discussed below.

Figure 4A:
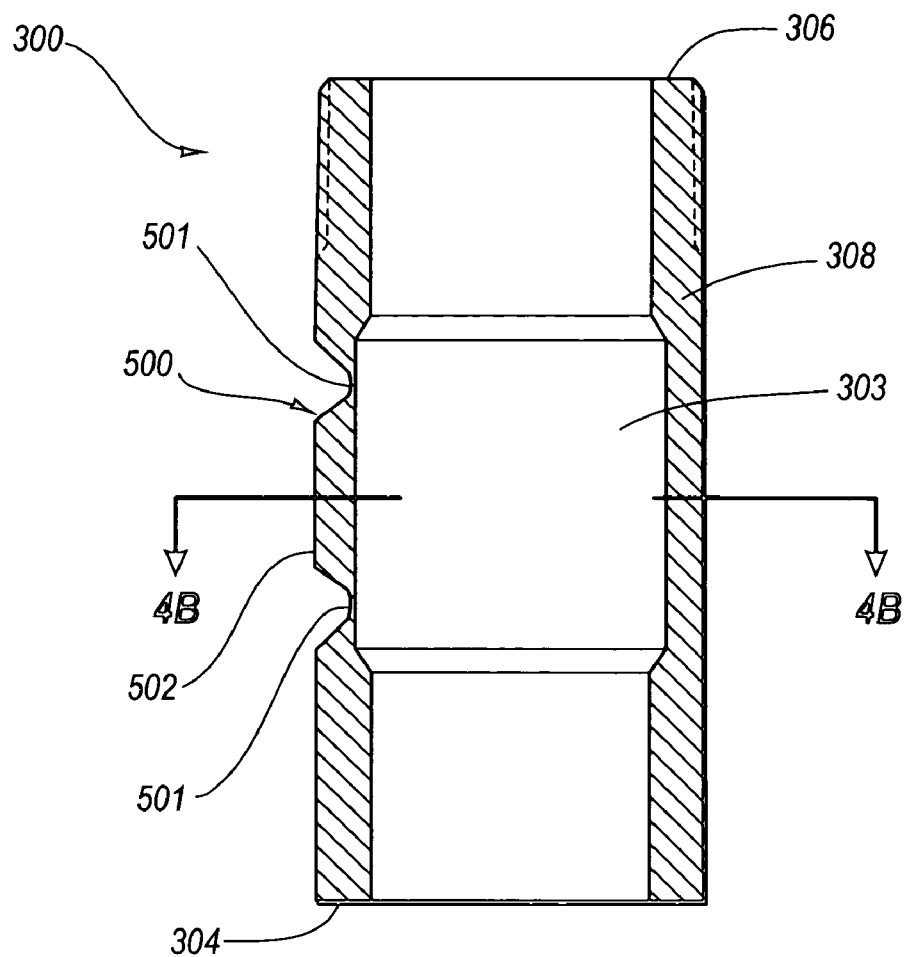
FIG. 4A is an axial section view illustrating aspects of an alternative implementation of a sacrificial element of a fluid system component as that sacrificial element appears prior to failure.
Figure 4B:
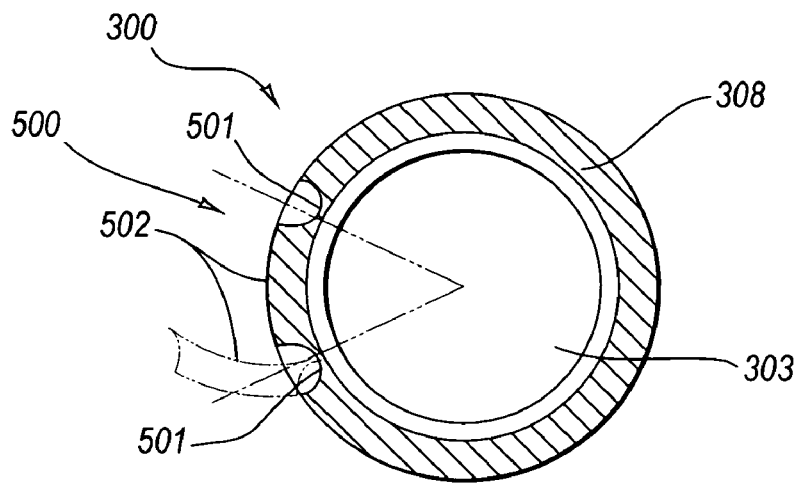
FIG. 4B is a radial section view taken from FIG. 4A and illustrates further aspects of the exemplary sacrificial element as that sacrificial element appears prior to failure.
Figure 4C:
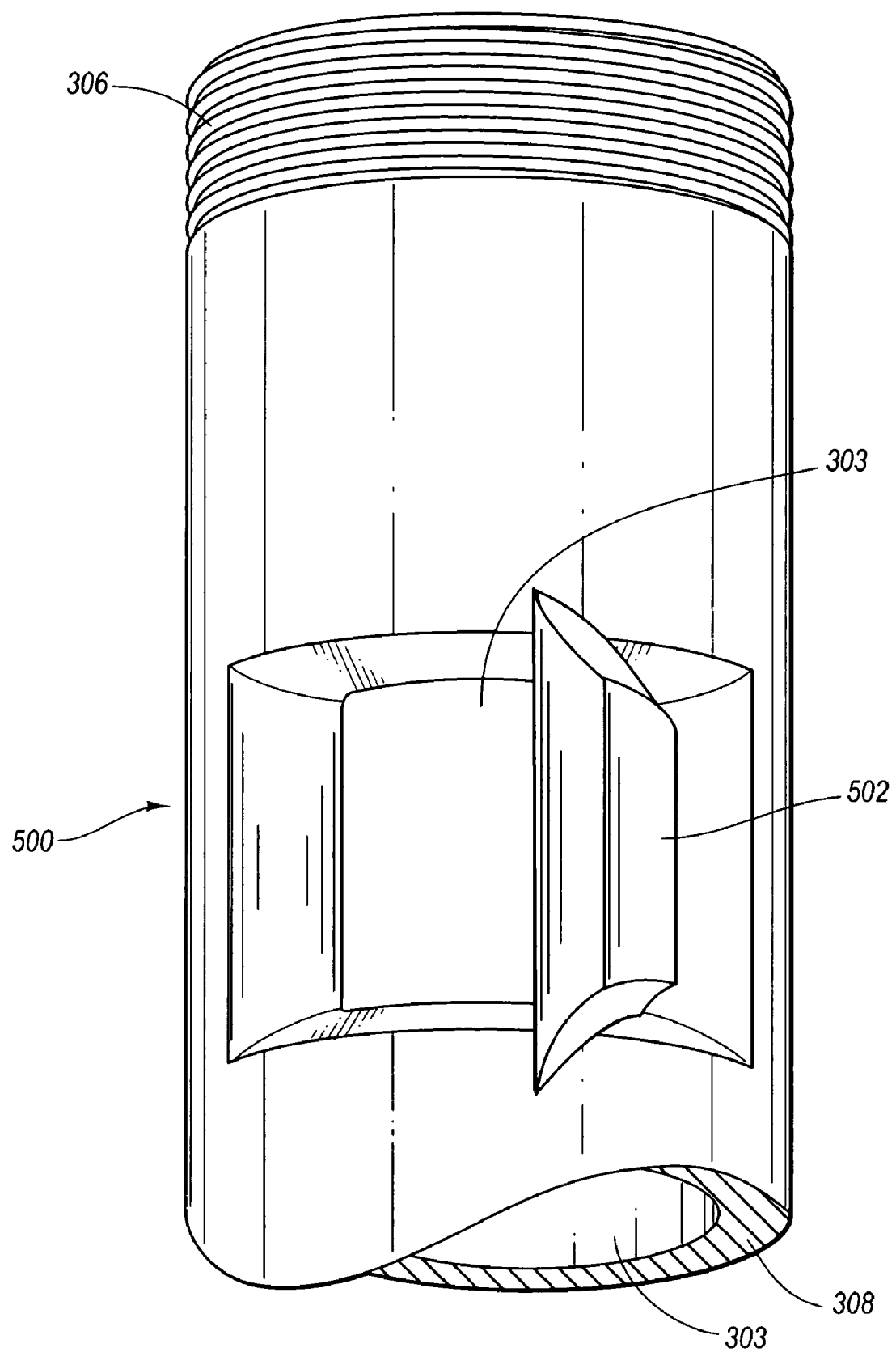
FIG. 4C is a perspective view of the exemplary fluid system component, illustrated in FIG. 4A, with a sacrificial element that has failed.

In particular, FIGS. 4A through 4C illustrate various aspects of a sacrificial element 500 that takes the form of a plurality of machined grooves 501 that cooperate to define the perimeter of a "blowout patch" 502. The thickness of the blowout patch 502 is, in this example, substantially the same as the thickness of the pipe wall 308. Aspects of the groove 501 geometry, such as the groove 501 length, width and depth, determine the pressure at which the blowout patch 502 will separate, at least partially, from the pipe wall 308, and thereby allow the release of the cessation product contained in the fluid passageway 303.

Figure 5A:
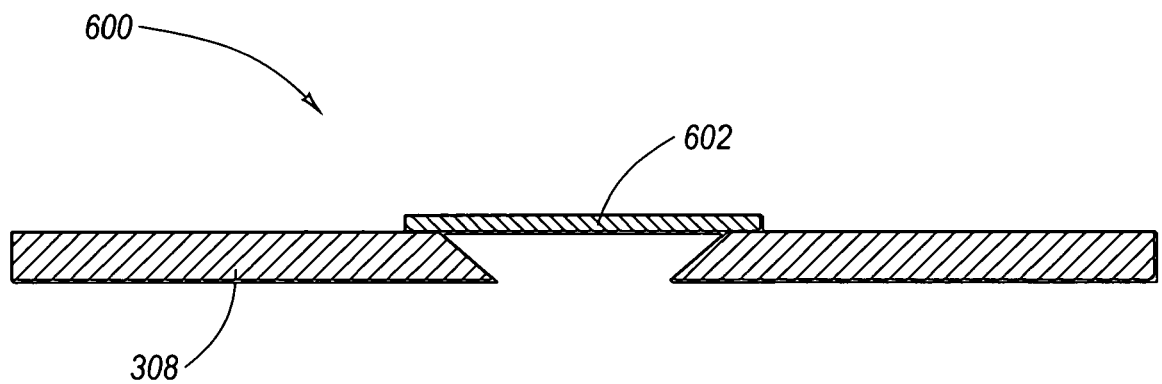
FIG. 5A is a section view of an alternative implementation of a sacrificial element.

In yet other cases, the sacrificial element may comprise a relatively thin window welded or brazed over, or into, an opening cut into the pipe wall 308 of the fluid system component 300. By way of example, FIG. 5A illustrates an arrangement where a fluid system component 600 is employed that includes a sacrificial element 602 that takes the form of a thin window of metal, for example, attached over an opening defined in the pipe wall 308. The opening in the pipe wall 308 may be cut, machined, or otherwise defined. Of course, other implementations of a sacrificial element are possible as well.

Figure 5B:
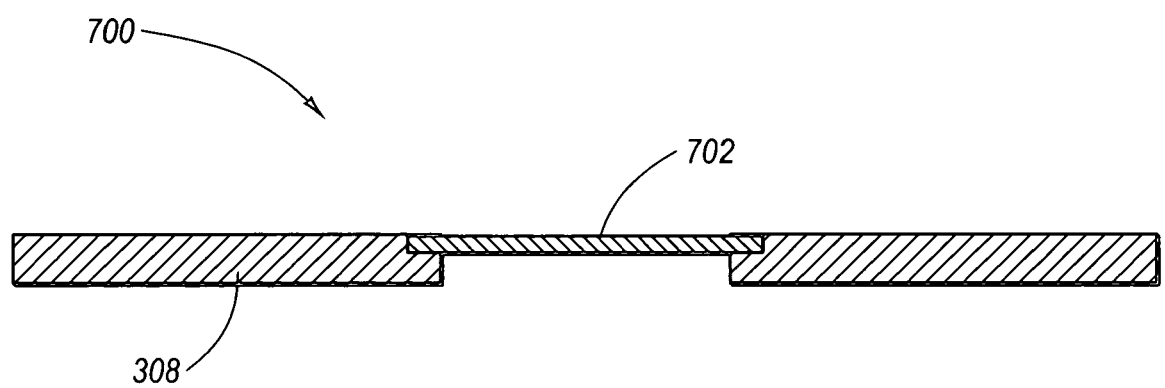
FIG. 5B is a section view of another alternative implementation of a sacrificial element.

In particular, FIG. 5B illustrates aspects of an arrangement where a fluid system component 700 is employed that includes a sacrificial element 702 that takes the form of a thin window of metal, for example, configured to be fitted within a corresponding recess, and associated opening, defined in the pipe wall 308 of the fluid system component 700. Any other arrangement of comparable functionality may alternatively be employed however.

III. Operational Aspects of Exemplary Fluid System Components

In operation, the sensor 210, if employed, is set to send a signal to the controller 208 of the cessation product system 200 when a particular type or concentration of one or more materials is detected. In response to receipt of this signal, the controller 208 causes the pump 204 to pump cessation product, such as mud, cement, concrete, latex, or other suitable material(s), from the reservoir 206 down through the wellhead 106 and into production pipe 104. In this exemplary operational scenario, the cessation product isolation valve 202 is configured to open automatically upon pump 204 start-up and, correspondingly, the isolation valve 108 downstream of the wellhead 106 is configured to be closed, either automatically or manually, at substantially the same time. In this regard, it was noted earlier that some operational scenarios are directed to substantially manual operation of the cessation product system 200.

Because the pressure of the cessation product is, typically, substantially greater than the line pressure in the wellhead 106 or the production pipe 104, discharge of the materials in the well pump discharge line substantially ceases. The pressure of the cessation product then continues to build up past the plastic yield point of the sacrificial element 400, causing the sacrificial element 400 to fail and thereby allowing any materials remaining in the production pipe 104, as well as the cessation product, to flow out of the opening created as a result of the failure of the sacrificial element 400, and into the well pump 102 suction line and casing (see FIG. 2). In this way, the well pump 102 and the casing 110 are permanently plugged by the outflow of cessation product so that no further significant discharge of materials from either the casing 110, the production pipe 104, or the well pump 102 discharge line, can occur.

In the case where the cessation product comprises a material such as cement or concrete, the cessation product sets up and hardens, thereby serving as a permanent plug to prevent further discharge of undesirable materials through the casing 110, production pipe 104 and well pump 102 discharge line. The casing 110, as well as the production pipe 104, can then be removed and salvaged, with the residual cessation product filling the cavity left behind by the removed casing 110 and production pipe 104.

As suggested by the foregoing then, one aspect of embodiments of the invention is that they enable ready and reliable control and containment of hazardous or undesirable materials that may be encountered during drilling and/or recovery operations. Further, both the fluid system component and associated sacrificial element are relatively easy and inexpensive to manufacture and install. Additionally, the fluid system component and associated sacrificial element can be readily customized to suit the requirements of a particular application.

It should be noted that while the exemplary embodiments of the invention disclosed herein are well-suited for use in conjunction with oil and gas drilling applications, these operating environments are exemplary only and embodiments of the invention may, more generally, be employed in any other environment wherein the functionality disclosed herein would prove useful. Accordingly, the exemplary operating environments disclosed herein should not be construed to limit the scope of the invention in any way.

The described embodiments are to be considered in all respects only as exemplary and not restrictive. The scope of the invention is, therefore, indicated by the appended claims rather than by the foregoing description. All changes which come within the meaning and range of equivalency of the claims are to be embraced within their scope.

What is claimed is:

1. A fluid system component, comprising:
    a body at least partially implemented in the form of a wall that defines a portion of a fluid passageway, said wall having a first internal surface, a second internal surface and an exterior surface, wherein said wall has a predetermined thickness at said first internal surface, and
    wherein at least a portion of said wall has a reduced thickness at said second internal surface forming a sacrificial element, wherein said second internal surface is offset from said first internal surface and said exterior surface, said sacrificial element and said wall comprising a single piece, said sacrificial element at least partially defining the fluid passageway, said sacrificial element being configured for preferential failure, relative to said body, when the pressure in said body exceeds a predetermined limit.

2. The fluid system component as recited in claim 1, wherein said body comprises a length of pipe or tubing.

3. The fluid system component as recited in claim 1, wherein said sacrificial element comprises a window having a thickness substantially less than the wall thickness of said body at said first internal surface.

4. The fluid system component as recited in claim 1, wherein said sacrificial element comprises a piece of material configured to rupture when exposed to said predetermined limit.

5. The fluid system component as recited in claim 1, wherein said sacrificial element comprises a plurality of grooves formed in said wall so as to substantially define the perimeter of a blowout patch.

6. The fluid system component as recited in claim 5, wherein a portion of one of said plurality of grooves fails in response to the occurrence of a predefined condition.

7. The fluid system component as recited in claim 1, wherein said body comprises a metal material.

8. A fluid system component, comprising:
    a body at least partially implemented in the form of a wall that defines a portion of a fluid passageway, said wall having a first internal surface, a second internal surface and an exterior surface, wherein said wall has a predetermined thickness at said first internal surface; and
    at least one sacrificial element comprised by a portion of said wall at said second internal surface, said at least one sacrificial element being continuous with said wall to comprise a single piece, and said at least one sacrificial element having a thickness substantially less than the thickness of said wall at said first internal surface so as to offset said first internal surface from said second internal surface, wherein said second internal surface is offset from said exterior surface, said at least one sacrificial element at least partially defining the fluid passageway, said at least one sacrificial element being configured to fail when the pressure in said body exceeds a predetermined limit.

9. The fluid system component as recited in claim 8, wherein the fluid system component substantially comprises a metallic material.

10. The fluid system component as recited in claim 8, wherein the at least one sacrificial element comprises a plurality of grooves formed in the wall so as to substantially define the perimeter of a blowout patch.

11. The fluid system component as recited in claim 10, wherein a portion of one of said plurality of grooves fails in response to the occurrence of a predefined condition.

12. The fluid system component as recited in claim 8, wherein the at least one sacrificial element comprises a window of predetermined geometry defined in the wall.

13. The fluid system component as recited in claim 8, wherein the fluid system component comprises a plurality of sacrificial elements.

14. The fluid system component as recited in claim 8, wherein the body comprises a length of pipe or tubing.

15. A sacrificial element formed in a section of production line pipe for use in intentionally plugging the production line and associated casing, the section of production line pipe including a portion having a reduced wall thickness forming the sacrificial element, the sacrificial element comprising:
    a window configured to facilitate failure of the sacrificial element; and
    a plurality of grooves formed in the wall of the section of production line pipe to at least partially define the perimeter of said window, wherein the wall thickness at said plurality of grooves and said window permits the sacrificial element to fail when the pressure in the production line exceeds a predetermined limit.

16. The sacrificial element as recited in claim 15, wherein a portion of said window fails when the pressure in the production line exceeds said predetermined limit.

17. The sacrificial element as recited in claim 15, wherein at least one of said plurality of grooves fails when the pressure in the production line exceeds said predetermined limit.

18. The sacrificial element as recited in claim 15, wherein a portion of said window and a portion of at least one of said plurality of grooves fails when the pressure in the production line exceeds said predetermined limit.

19. A fluid system suitable for use in connection with a well system that includes a well pump configured for fluid communication with a wellhead by way of a well pump discharge line, the fluid system comprising:
   a cessation product system that includes:
      a pump configured for fluid communication with the well pump by way of the wellhead;
      a pump controller configured for operable communication with said pump;
      a cessation product reservoir in fluid communication with said pump and configured to hold a volume of cessation product; and
      a sensor configured to operably communicate with said pump controller; and
   a fluid system component configured for fluid communication with the well pump and the wellhead, the fluid system component comprising a sacrificial element, said sacrificial element being configured for preferential failure when the pressure in said fluid system component exceeds a predetermined limit.

* * * * *